(12) United States Patent
Jou

(10) Patent No.: US 8,005,435 B2
(45) Date of Patent: Aug. 23, 2011

(54) ULTRA-WIDEBAND TRANSCEIVER

(75) Inventor: Chewn-Pu Jou, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 978 days.

(21) Appl. No.: 11/799,065

(22) Filed: Apr. 30, 2007

(65) Prior Publication Data

US 2008/0267325 A1 Oct. 30, 2008

(51) Int. Cl.
H04B 1/38 (2006.01)
(52) U.S. Cl. .......................... 455/73; 375/344
(58) Field of Classification Search .............. 455/73, 455/295, 41.2; 341/155, 158; 375/260
See application file for complete search history.

(56) References Cited

U.S. PATENT DOCUMENTS

| | | | |
|---|---|---|---|
| 6,501,410 B1* | 12/2002 | Kameda et al. | 341/155 |
| 2004/0189326 A1* | 9/2004 | Chikamatsu | 324/650 |
| 2004/0218693 A1* | 11/2004 | Hickling | 375/316 |
| 2006/0068739 A1* | 3/2006 | Maeda et al. | 455/295 |
| 2006/0084382 A1* | 4/2006 | Ibrahim et al. | 455/41.2 |
| 2007/0025456 A1* | 2/2007 | McCrady | 375/260 |
| 2007/0096980 A1* | 5/2007 | Gradincic et al. | 342/357.06 |
| 2007/0110171 A1* | 5/2007 | Iida | 375/260 |
| 2007/0160164 A1* | 7/2007 | Sahota | 375/295 |
| 2007/0173277 A1* | 7/2007 | Yun | 455/522 |
| 2007/0177653 A1* | 8/2007 | Bjerede | 375/130 |
| 2007/0223608 A1* | 9/2007 | Nakayama et al. | 375/260 |
| 2007/0232244 A1* | 10/2007 | Mo et al. | 455/91 |
| 2008/0266161 A1* | 10/2008 | Zipper et al. | 341/158 |

OTHER PUBLICATIONS

"High Rate Ultra Wideband PHY and MAC Standard" Standard ECMA-368, Ecma International, 1$^{st}$ Edition, Dec. 2005, 322 pages.
"MAC-PHY Interface Specification for ECMA-368" Standard ECMA-369, Ecma International, 1$^{st}$ Edition, Dec. 2005, 52 pages.

* cited by examiner

Primary Examiner — Edward Urban
Assistant Examiner — Golam Sorowar
(74) Attorney, Agent, or Firm — Slater & Matsil, L.L.P.

(57) ABSTRACT

The processing of information signals is described in an Ultra Wideband (UWB) transceiver. The transceiver has both transmission and receiver paths for processing information signals. In the receiver path, broadcast RF signals are converted to a zero intermediate frequency (IF) signal using a reference signal from a phase-locked loop (PLL) that can selectively provide a reference signal corresponding to the center frequencies of a plurality of signal band groups. The IF signal is then selectively modulated into the baseband signal to be digitized for presentation. In the transmission path, the incoming digital signals are converted to analog baseband signals and selectively modulated into their own zero IF signals. Using the same PLL of the receiver path, the zero IF signals are modulated into the transmission RF signals directed to the target signal band of the target signal band group.

47 Claims, 7 Drawing Sheets

ULTRA-WIDEBAND TRANSCEIVER

TECHNICAL FIELD

The present invention relates, in general, to radio frequency (RF) signal devices, and, more particularly, to ultra-wideband transceivers.

BACKGROUND

Wideband digital communications systems continue to increase in number and reach. Such systems, including the various digital subscriber lines (XDSL) (e.g., asynchronous, synchronous, very high speed), IEEE 802.11 a/g Wi-Fi Wireless local area networks (LAN), IEEE 802.16 WiMAX mobile area network (MAN), IEEE 801.20 Mobile Broadband Wireless Access (MBWA), and other wide and ultra wideband (UWB) communication systems, are being established in an effort to increase the accessibility of information and communication.

The information communicated over these systems, as well as the earliest forms of electronic systems, is typically modulated in order to transport a large amount of data over varying amounts of bandwidth. Single-carrier modulation schemes have generally been preferred in such systems as the single-carrier schemes tend to exhibit a higher data rate than multi-carrier schemes. One modulation scheme that has recently been considered for use in UWB systems is orthogonal frequency division multiplexing (OFDM).

OFDM is a digital, multi-carrier modulation scheme that uses a large number of closely-spaced orthogonal sub-carriers, each modulated with a conventional modulation scheme, such as quadrature amplitude modulation (QAM), at a low symbol rate. This combination has generally produced data rates on par with conventional single-carrier schemes. One of the primary advantages of OFDM over single-carrier schemes, however, is the ability to deal with severe channel conditions, such as multipath and narrowband interference, without the necessity for complex equalization filters. Channel equalization is simplified because OFDM may be viewed as using many slowly-modulated narrowband signals rather than one rapidly-modulated wideband signal.

Multiband OFDM (MB-OFDM) is one of the modulation schemes being supported and used in digital UWB communications systems, including wireless personal area network (WPAN) technology. One of the challenges in providing MB-OFDM to digital communications systems is the design and development of MB-OFDM UWB transceivers. Because the sub-carriers in MB-OFDM are orthogonal, cross-talk between the sub-channels is essentially eliminated. Thus, inter-carrier guard bands are not typically required. This feature greatly simplifies the design of the transmitters, receivers, and transceivers. However, MB-OFDM typically encourages very accurate frequency synchronization between the receiver and transmitter. Virtually any deviation from the sub-carrier can destroy the orthogonality of the sub-carriers and cause inter-carrier interference (ICI). OFDM is generally susceptible to Doppler shift during movement. Therefore, the compensation for Doppler shift and other factors that affect the orthogonality of the sub-carriers increase the complexity of the transmitters, receivers, and transceivers.

UWB transmission regulations request that the RF signal be transmitted within band groups. Currently, the multi-band systems divide the UWB spectrum into several smaller bands with some systems grouping those bands into band groups. For example, WiMedia Alliance's WIMEDIA® standard, which is the de facto standard radio platform for UWB wireless networking, divides the UWB spectrum into 14 bands (labeled as band #1-#14) organized into five band groups (labeled band group (or "BG") #1-#5) over a center frequency range from 3432 MHz to 10296 MHz.

In meeting the requested band/band group organizational structure, the RF carrier quickly hops between each band within a particular band group. Two circuit architectures have been commonly deployed for MB-OFDM UWB transceivers. The first uses three different phase-locked loops (PLLs) operating at three different frequencies. The particular reference frequency is selected using an RF switch that selects the particular PLL.

There are several disadvantages to the three-PLL transceiver. First, PLLs occupy a considerable amount of chip/silicon space and consume relatively large amounts of power. Additionally, if the PLLs are not properly isolated from one another, each will introduce interference with the others. The RF switch also causes potential problems by introducing a different load impedance to the PLLs, which tends to disturb the lock status of the PLLs. This disturbed lock status typically calls for the addition of PLL output buffers that consume even more power and take up additional chip space.

The second transceiver architecture deploys a single PLL at a center frequency along with a complex frequency translation circuit that either shifts the PLL output frequency up or down by a certain amount or does not shift the frequency at all. Each state depends on which frequency band is needed. This architecture reduces the circuit chip area and also the power consumption compared with the three-PLL transceiver. However, the output of this transceiver contains certain inevitable harmonics with amplitudes between −30-−50 dBc, compared with typical harmonic amplitudes between −60-−70 dBc in WLAN or Global System for Mobile Communications (GSM) synthesizer output. Such higher spurious signals in the local oscillator (LO) output spectrum may cause several drawbacks to radio transceiver performance.

First, the higher spurious signals in the LO spectrum renders the receiver more susceptible to interference from external signals, such as those from WLAN in the 2.4-5 GHz band as well as the future signals from WiMAX in the >3.5 GHz band. Such high power interference signals are 40-50 dB higher than UWB signals to begin with, and when mixed into the MB-OFDM baseband spectrum, would likely disable normal operation of a UWB system without extra RF filtering.

Another drawback to the second transceiver architecture is the electromagnetic interference (EMI) that is transmitted from such a transceiver. In operation, the EMI of the transmission spectrum directly exports the spurious content with the intended UWB transmission. The additional spurious content and power level in the EMI could exceed the regulatory limits for EMI in any given location.

SUMMARY OF THE INVENTION

These and other problems are generally solved or circumvented, and technical advantages are generally achieved, by preferred embodiments of the present invention that utilize the advantages of high-speed modern deep submicron semiconductor manufacturing processes to create a transceiver that handles UWB signals in a zero-IF or low frequency IF band (e.g., lower than 800 MHz), leaving the RF synthesizer frequency unchanged during the entire communication process. The zero-IF processing section is preferably made from a combination of linear elements, such as amplifiers, filters, as well as single side-band (SSB) frequency converters, and analog switches. The various embodiments of the present invention are implemented using a single RF-to-IF/IF-to-RF PLL that is shared across both the transmission and receive path.

In accordance with a preferred embodiment of the present invention, a method for processing one or more information signals includes receiving a broadcast radio frequency (RF) signal that represents one of the information signals. The broadcast RF signal is translated into a low-frequency intermediate frequency (IF) signal using a reference signal provided by a phase-locked loop (PLL). The PLL is configured to selectively provide a reference signal at one of a plurality of frequencies representing a center frequency for a plurality of signal band groups. The low-frequency IF signal is selectively modulated into a baseband information signal, which is then digitized into a digital information signal. In the transmission path, another digital information signal is designated for transmission. This digital information signal is converted into an analog baseband signal and then selectively converted into another low-frequency IF signal. Using the same PLL from the receiver path, the low-frequency IF signal is selectively modulated into a transmission RF signal. The transmission RF signal may then be transmitted or broadcast.

In accordance with another preferred embodiment of the present invention, an ultra wideband (UWB) communication component includes a digital-to-analog converter (DAC) operable to convert input digital data into a baseband analog signal. The component also includes a selective intermediate frequency (IF) component configured to selectively generate a low-frequency IF signal from the baseband analog signal. The selective generation is based on a target signal band in one of the signal band groups. The component also includes a phase-locked loop (PLL) adapted to selectively produce a reference signal at one of a plurality of center frequencies associated with the plurality of signal band groups. A radio frequency (RF) modulator is also included that is configured to use the reference signal to modulate the low-frequency IF signal into an RF transmission signal of the target signal band.

In accordance with another preferred embodiment of the present invention, a method for processing ultra wideband (UWB) information signals in a receiver path includes receiving an RF information signal that has a frequency within one of a plurality of signal band groups. Responsive to that particular frequency, a reference signal is selected from a plurality of frequencies that represent a center frequency for the plurality of signal band groups. The RF information signal is mixed into a zero IF signal using the selected reference signal and selectively converted into a baseband signal. The baseband signal is then digitized into a digital information signal for presentation.

In accordance with another preferred embodiment of the present invention, an ultra wideband (UWB) transceiver includes a receiver path and a transmitter path. The transmitter path includes a digital-to-analog converter (DAC) operable to convert input digital data into a baseband analog signal. It also includes a selective intermediate frequency (IF) component configured to selectively generate a low-frequency IF signal from the baseband analog signal. Selection is based on a target signal band in one of the signal band groups. The UWB transceiver includes a phase-locked loop (PLL) adapted to selectively produce a reference signal at one of a plurality of center frequencies associated with the plurality of signal band groups, and also includes a radio frequency (RF) modulator configured to use the reference signal to modulate the low-frequency IF signal into an RF transmission frequency of the target signal band. The receiver path includes a mixer configured to use a receiver reference signal from the same PLL to translate a received RF data signal into another low-frequency IF signal. There is also a selective IF receiver component configured to selectively generate another baseband analog signal. The selection of the baseband frequency generation is based on an originating signal band in one of the plurality of signal band groups. The receiver path also includes an analog-to-digital converter (ADC) operable to convert the baseband analog signal into a digital information signal that is then used for presentation of the information.

One advantage of the various embodiments of the present invention is that the ultra-fast-hopping RF synthesizer of the prior art is now replaced with the complexity of the UWB IF section, which is either linear or, under current regulations, has a fixed frequency of around 524 MHz. Using modern deep submicron semiconductor technology, the power and area requirements for implementing such an UWB IF section are much less (lower power and lower chip area) and fabrication is much easier than implementing the ultra-fast-hopping RF synthesizer of the prior art.

Another advantage to the various embodiments of the present invention is the lower local oscillator (LO) spurious levels. Because the RF synthesizer is fixed at the middle of the particular operating band group, low level spurious LO signals may be obtained because of the reduced PLL filter bandwidth. Through the lower spurious LO signal levels, better radio receiver sensitivity and electromagnetic interference (EMI) characteristics of the output spectrum are expected.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an MB-OFDM UWB transceiver. The invention may also be applied, however, to other UWB transceivers.

Figure 1:
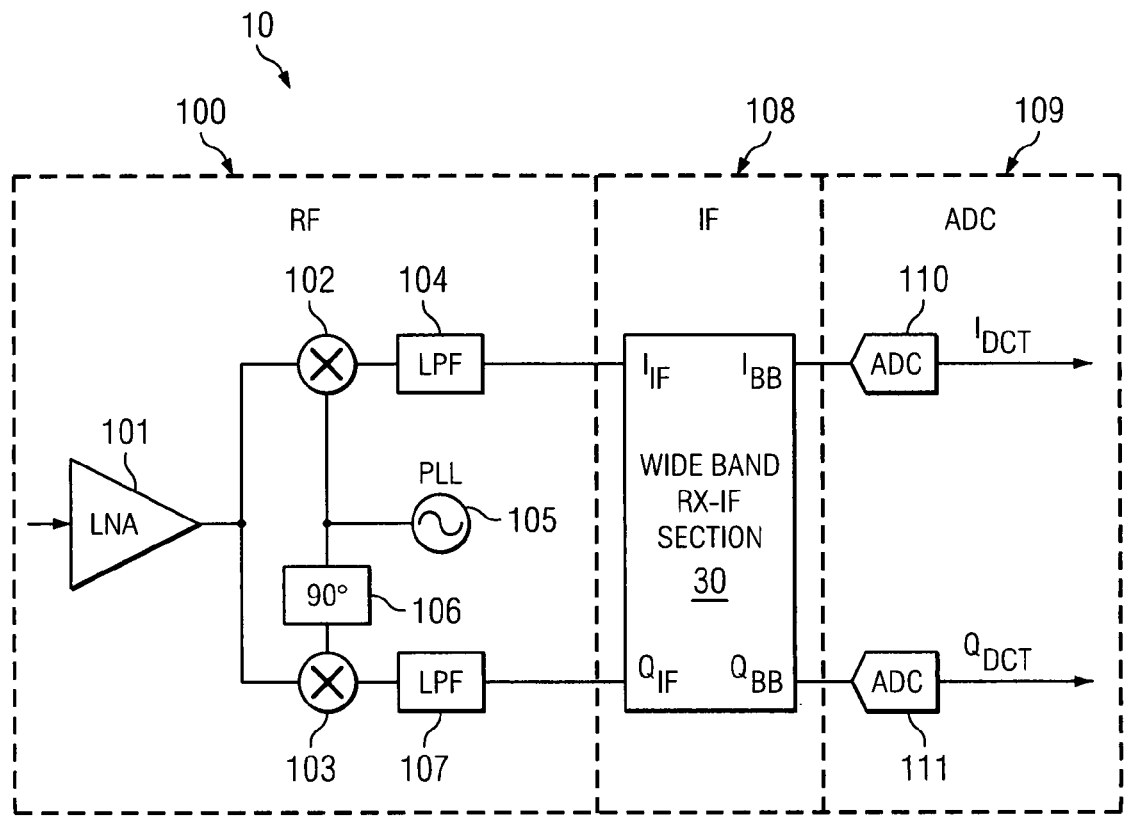
FIG. 1 is a block circuit diagram of a receiver path of a MB-OFDM transceiver configured according to one embodiment of the present invention.

With reference now to FIG. 1, there is shown a block circuit diagram of receiver path 10 of an MB-OFDM UWB transceiver configured according to one embodiment of the present invention. Receiver path 10 comprises three path sections: (1) RF section 100; (2) intermediate frequency (IF) section 108; and (3) analog-to-digital conversion (ADC) section 109. Each section will be described in detail below.

RF section 100 comprises low noise amplifier 101 connected to mixers 102 and 103. Mixers 102 and 103 are provided with a reference signal generated by PLL 105. The reference signal from PLL 105 enters mixer 102 directly, but the reference signal that enters mixer 103 first passes through phase shifter 106, in which the reference signal is shifted by 90° to create the quadrature of the reference signal. RF section 100, therefore, provides an I/Q signal output consisting of information signal ($I_{IF}$) and quadrature signal ($Q_{IF}$). $I_{IF}$ and $Q_{IF}$ are then conditioned before exiting RF section 100 by passing through low-pass filters (LPF) 104 and 107, respectively.

The input signals to RF section 100 is represented by two formulae:

$$A \cos(\omega_o \pm \omega_i)t \quad (1)$$

$$+B \cos(\omega_o \pm \omega_i)t \quad (2)$$

Where A and B are time varying functions slower than radio frequency $\omega_o$ or intermediate frequency $\omega_i$. The sign used in equations (1) and (2) depends on whether the signals originate from the upper band, which uses +, or the lower band, which uses −.

The input signals are conditioned and amplified by LNA 101 and split into two paths. The first path provides a first input to mixer 102. The reference input to mixer 102 is provided by PLL 105. The frequency of the reference input generated by PLL 105 will depend on which band group the receiver is receiving from. The reference input signal generated by PLL 105 is represented by the formula:

$$\cos \omega_o t \quad (3)$$

The second path from LNA 101 provides a first input to mixer 103. The reference signal generated by PLL 105 is first phase-shifted by 90° before arriving at mixer 103 as a quadrature (Q) reference signal. The Q reference signal is represented by the formula:

$$\cos(\omega_o t + 90) = \sin \omega_o t \quad (4)$$

After mixing the signals in mixer 102, the resulting mixed signals, $I_{IF}$, are represented by the following formulae:

$$I_{IF} = A \cos(\omega_o \pm \omega_i)t \cos \omega_o t \rightarrow \pm A/2 \cos \omega_i t \quad (5)$$

$$I_{IF} = +B \cos(\omega_o \pm \omega_i)t \cos \omega_o t \rightarrow \pm B/2 \sin \omega_i t \quad (6)$$

Where again, the sign of the resulting signal depends on whether the signal originates from the upper band, in which the sign for the A signal will be +, with the sign for the upper band B signal being −, or the lower band, in which the sign for A will be −, with the sign for the lower band B being +.

The resulting mixed signals, $Q_{IF}$, output from mixer 103 are represented by the following formula:

$$Q_{IF} = A \cos(\omega_o \pm \omega_i)t \sin \omega_o t \rightarrow \pm A/2 \sin \omega_i t \quad (7)$$

$$Q_{IF} = +B \cos(\omega_o \pm \omega_i)t \sin \omega_o t \rightarrow \pm B/2 \cos \omega_i t \quad (8)$$

Where the sign for the upper band A signal will be −, with the sign for the upper band B signal being +, or the lower band, in which the sign for A will be +, with the sign for the lower band B being −. $I_{IF}$ and $Q_{IF}$ are then filtered at LPF 104 and 107 to remove any unwanted and/or spurious signals above a desired frequency.

It should be noted that mixers 102 and 103 are designed along with the reference signals from PLL 105 to generate an IF signal having a very low frequency, i.e., lower than about 800 MHz. IF signals in this frequency range are typically referred to as zero-IF signals. The zero-IF approach enables direct conversion of analog RF signals to a digital baseband format, which allows for a reduction in the necessary hardware components.

For purposes of the example embodiment illustrated in FIG. 1, the UWB transceiver operates according to the WIMAX® standard. In order to accommodate this standard, PLL 105 is capable of generating the center frequency for each band group (i.e., 3960 MHz—BG #1; 5544 MHz—BG #2; 7128 MHz—BG #3; etc.). Moreover, LPF 104 and 107 have a cut-off frequency about 792 MHz or so.

IF section 108 comprises wideband RX-IF circuitry 30 (detailed in FIG. 3), which processes $I_{IF}$ and $Q_{IF}$ into baseband signals $I_{BB}$ and $Q_{BB}$. $I_{BB}$ and $Q_{BB}$ are then input into ADC section 109, in which $I_{BB}$ is converted into a digital signal by ADC 110 and $Q_{BB}$ is converted into a digital signal by ADC 111. $I_{DCT}$ and $Q_{DCT}$ are output from receiver section 10 of the UWB transceiver for further desired processing of the transmitted information.

Figure 2:
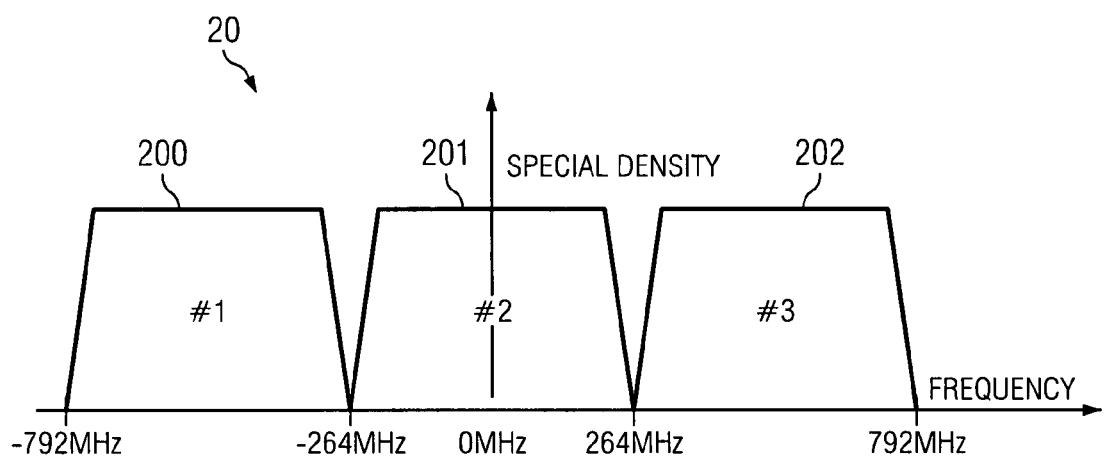
FIG. 2 is a graph illustrating zero-IF signals generated in a transceiver configured according to one embodiment of the present invention.

Turning now to FIG. 2, a graph illustrates zero-IF signals generated in a transceiver configured according to one embodiment of the present invention. The zero-IF signals represent the three signal bands of an entire band group. For purposes of this example, the zero-IF signals illustrated in graph 20 represent the signal bands of WIMAX® band group #1, band #1—200, band #2—201, and band #3—202, after being processed by a low-pass filter, such as LPF 104 or 107 (FIG. 1), to remove any unnecessary spurious signals. In actual operation, bands #1—200, #2—201, and #3—202, would take turns, such that, at any given transmission point, only one such signal band would be present in the zero-IF signal. All three signal bands are illustrated in graph 20 of FIG. 2 to provide a representation of the wideband signal of the entire band group.

Figure 3:
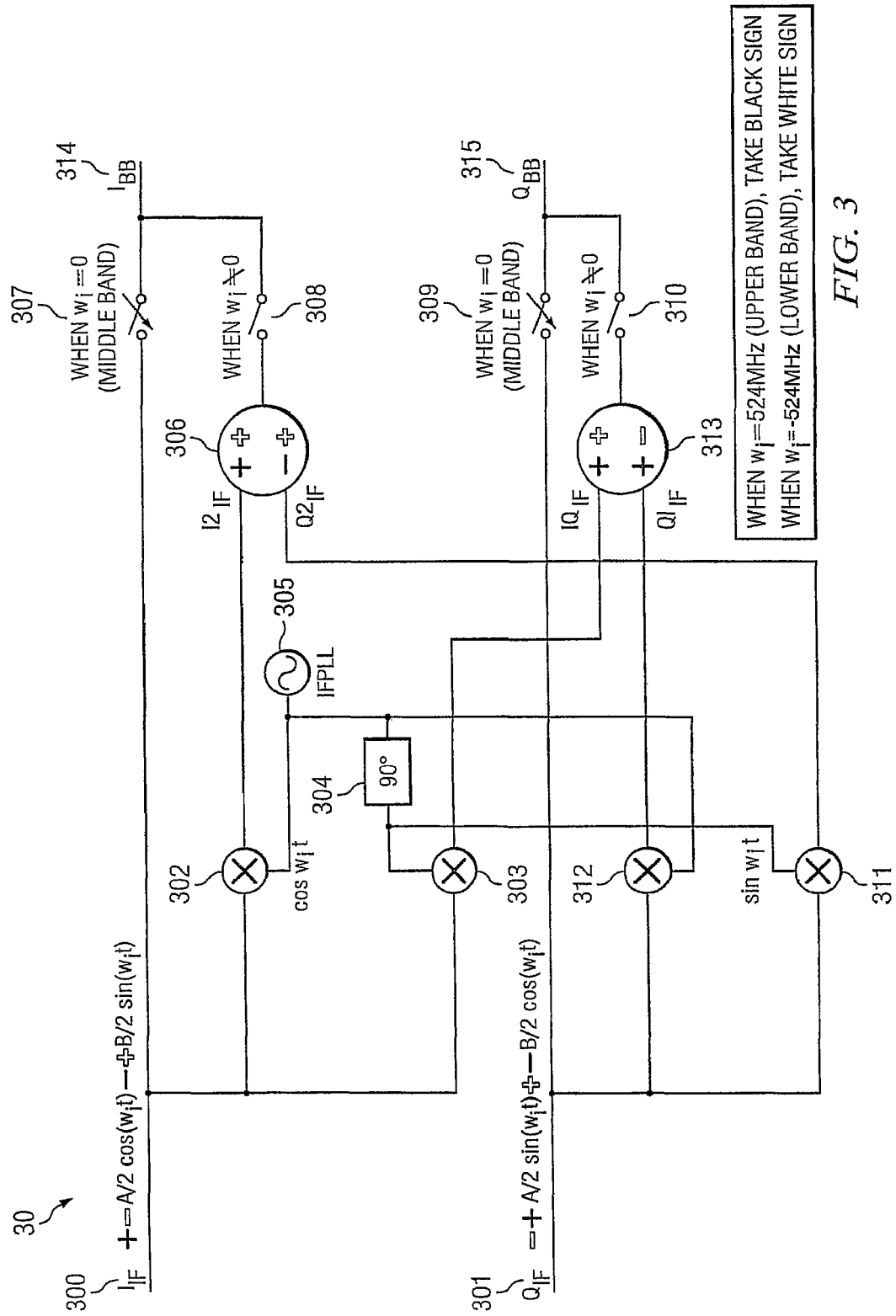
FIG. 3 is a circuit diagram illustrating wideband RX-IF circuitry configured according to one embodiment of the present invention.

FIG. 3 is a circuit diagram illustrating wideband RX-IF circuitry 30 configured according to one embodiment of the present invention. Zero-IF signals, $I_{IF}$ and $Q_{IF}$, enter wideband RX-IF circuitry 30 at inputs 300 and 301 to be converted into baseband signals. The path that each signal takes through wideband RX-IF circuitry 30 depends on which of the signal bands is received. When the center IF frequency, $\omega_i$, equals about 524 MHz, the signal corresponds to the upper band signal, i.e., signal band #3—202 (FIG. 2) and is processed through the mixing circuits of wideband RX-IF circuitry 30. When the center IF frequency, $\omega_i$, equals about 0 Hz, the signal corresponds to the middle band signal, i.e., signal band #2—201 (FIG. 2) and is sent directly through wideband RX-IF circuitry 30 without any further processing. Thus, $I_{IF}$ will be output directly as $I_{BB}$, and $Q_{IF}$ will be output directly as $Q_{BB}$. Finally, when the center IF frequency $\omega_i$ equals about −524 MHz, the signal corresponds to the lower band signal, i.e., signal band #1—200 (FIG. 2) and is, once again, processed through the mixing circuits of wideband RX-IF circuitry 30.

Switches 307-310 control which signals are output at $I_{BB}$ output 314 and $Q_{BB}$ output 315. Switches 307 and 309 are closed and switches 308 and 310 are open when the center IF frequency, $\omega_i$, equals about 0 Hz. This provides a completed circuit straight through wideband RX-IF circuitry 30 to $I_{BB}$ output 314 and $Q_{BB}$ output 315. Switches 308 and 310 are closed and switches 307 and 309 are open when the center IF frequency, $\omega_i$, does not equal about 0 Hz. This switch set-up provides the circuit path through the various mixing stages of wideband RX-IF circuitry 30. Thus, the output at $I_{BB}$ output 314 and $Q_{BB}$ output 315 is controlled by the frequency of $\omega_i$.

Wideband RX-IF circuitry 30 also includes mixers 302 and 303, which operate on $I_T$. Mixer 302 processes $I_{IF}$ with a first reference signal from IF PLL 305 to output $I2_{IF}$. Mixer 303 processes $I_{IF}$ with a quadrature reference signal, which results from the first reference signal from IF PLL 305 being shifted in phase by 90° by phase shifter 304. Mixer 303 outputs $IQ_{IF}$. Mixers 311 and 312 are also included in wideband RX-IF circuitry 30 for processing $Q_{IF}$. Mixer 312 mixes $Q_{IF}$ with the first reference signal from IF PLL 305 to output $QI_{IF}$. Mixer 311 mixes $Q_{IF}$ with the quadrature reference signal from IF PLL 305 to output $Q2_{IF}$. The baseband output signals, $I_{BB}$ and $Q_{BB}$, are then generated from $I2_{IF}$, $IQ_{IF}$, $QI_{IF}$, and $Q2_{IF}$, respectively.

$I_{BB}$ is formed by adding or subtracting $I2_{IF}$ and $Q2_{IF}$, and $Q_{BB}$ is formed by adding or subtracting $QI_{IF}$ and $IQ_{IF}$. The determination of whether the respective mixed signals are added or subtracted depends on whether or not the initial signal originates in the upper band or the lower band. With reference to FIG. 2, the upper band signals are mixed to signal band #1—200. Because the desired baseband frequency is the frequency represented by signal band #2—201, when the upper band is determined, the upper band IF signal will be translated up to the frequency of signal band #2—201. Conversely, the lower band signals mix to signal band #3—202. Again, because the desire is to achieve a baseband frequency at the frequency represented by signal band #2—201, the lower band signals are translated lower by the same amount (about 524 MHz in FIG. 2), to reach the appropriate baseband frequency. Because the middle band signals mix to the desired baseband frequency, no further mixing of modulating is required, and the mixed middle band signals are passed directly on to become the baseband signal.

Figure 4:
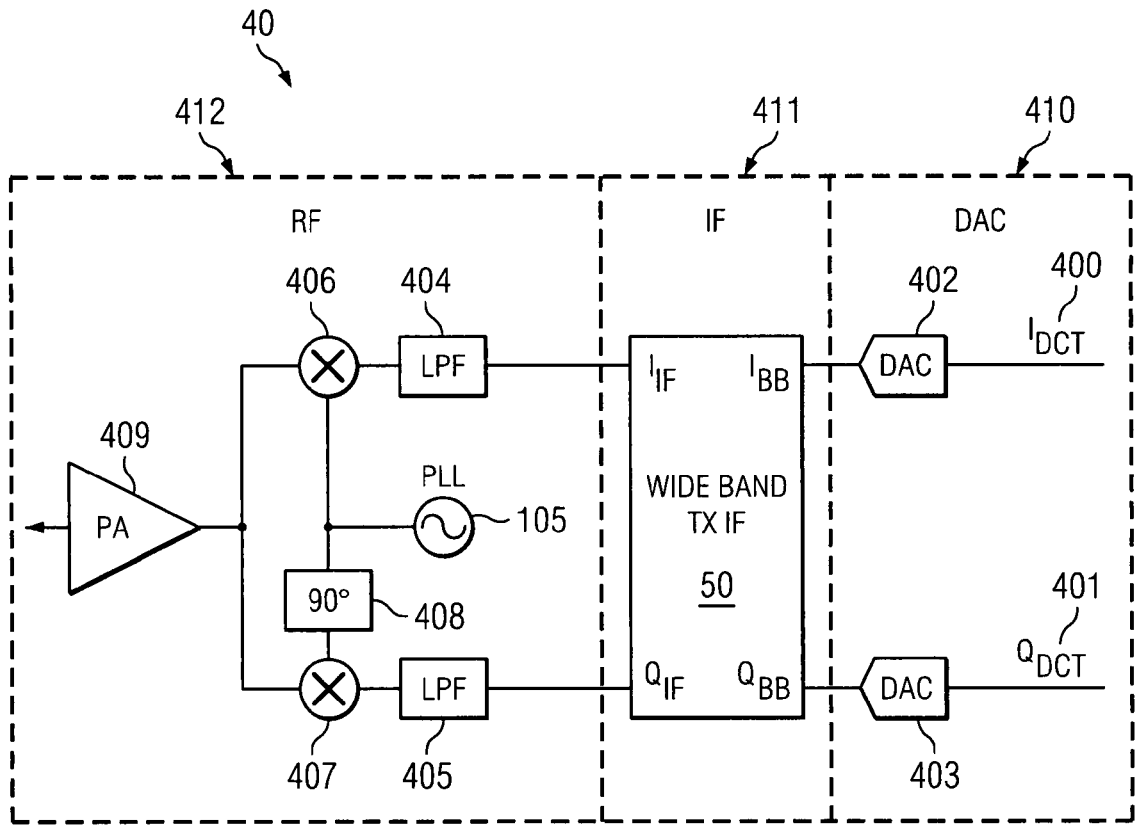
FIG. 4 is a circuit diagram illustrating the transmission path of a MB-OFDM transceiver configured according to one embodiment of the present invention.

FIG. 4 is a circuit diagram illustrating transmission path 40 of an MB-OFDM transceiver configured according to one embodiment of the present invention. Transmission path 40 comprises digital-to-analog conversion (DAC) section 410, transmission (TX) IF section 411, and RF section 412. Digital information is received in quadrature at inputs 400 and 401, converted to analog and processed before transmission through PA modulator 409.

Digital input signals, $I_{DCT}$ and $Q_{DCT}$, enter transmission path 40 through inputs 400 and 401. $I_{DCT}$ is processed by DAC 402 converting the digital signal into analog baseband signal, $I_{BB}$. $Q_{DCT}$ is similarly processed by DAC 403 converting the digital signal into analog baseband quadrature signal, $Q_{BB}$. $I_{BB}$ and $Q_{BB}$ then enter wideband TX-IF circuitry 50 of TX-IF section 411 for conversion from baseband to IF. When $I_{BB}$ and $Q_{BB}$ originate in the middle band, they are directly amplified into $I_{IF}$ and $Q_{IF}$ without any frequency translation. Conversely, when $I_{BB}$ and $Q_{BB}$ are in the upper or lower bands, they are translated by around +528 MHz, for upper band, and about −528 MHz, for lower band, into $I_{IF}$ and $Q_{IF}$.

$I_{IF}$ and $Q_{IF}$ exit TX-IF section 412 and enter RF section 412 through LPF 404 and 405. LPF 404 and 405 each have a cutoff frequency of about 792 MHz, thus, passing $I_{IF}$ and $Q_{IF}$ with any unwanted spurious signals cut off over that frequency. In order to prepare the information signal for transmission, $I_{IF}$ and $Q_{IF}$ are mixed into RF transmission frequency through mixers 406 and 407. PLL 105, which is shared with receiver path 10 (FIG. 1), provides the reference signals for translating $I_{IF}$ and $Q_{IF}$ to the appropriate transmission frequencies. As noted before, PLL 105 is capable of generating the center frequency for each band group. Therefore, the reference signal generated by PLL 105 is controlled by the target band group for the information signals, $I_{IF}$ and $Q_{IF}$.

Mixer 406 translates $I_{IF}$ into $I_{RF}$ using the reference signal provided by PLL 105. Mixer 407, however, translates $Q_{IF}$ also into $I_{RF}$ using the quadrature reference signal resulting from the reference signal from PLL 105 being phase shifted by 90° in phase shifter 408. The two results of mixing $Q_{IF}$ with the quadrature reference signal shifts the quadrature signal back in phase with $I_{RF}$. $I_{RF}$ is then input into PA 409 for amplification and modulation for ultimate transmission.

Figure 5:
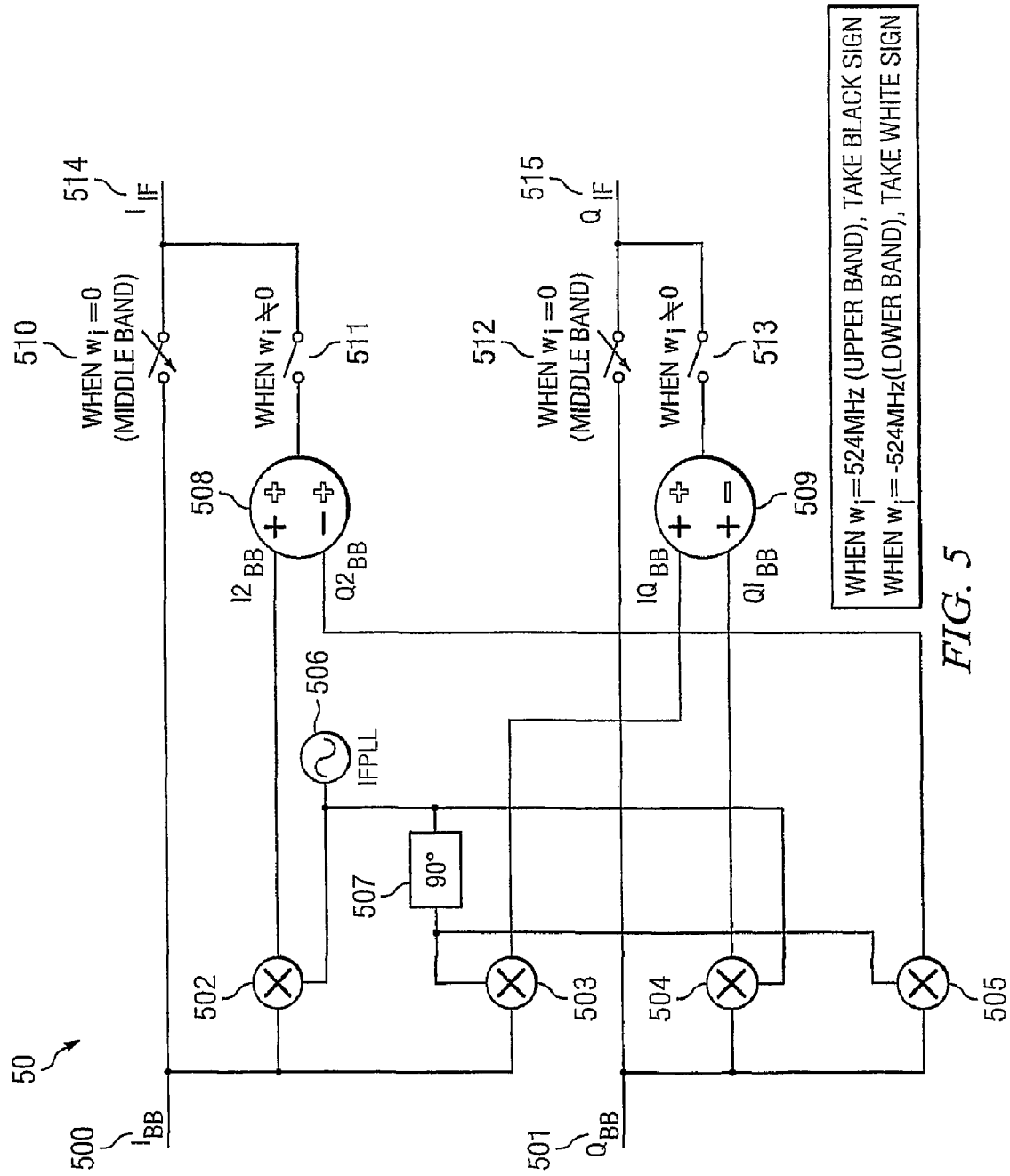
FIG. 5 is a circuit diagram illustrating wideband TX-IF circuitry in a MB-OFDM transceiver configured according to one embodiment of the present invention.

FIG. 5 is a circuit diagram illustrating wideband TX-IF circuitry 50 in an MB-OFDM transceiver configured according to one embodiment of the present invention. The input signals, $I_{BB}$ and $Q_{BB}$, from DAC section 410 (FIG. 4) are processed in wideband TX-IF circuitry 50 according to which signal band the signal is targeted for. When $I_{BB}$ and $Q_{BB}$ are targeted for the middle band, switches 510 and 512 close, allowing $I_{BB}$ and $Q_{BB}$ to pass directly to outputs 514 and 515 as IF signals, $I_{IF}$ and $Q_{IF}$. However, when $I_{BB}$ and $Q_{BB}$ are targeted for the upper or lower bands, switches 510 and 512 remain open, while switches 511 and 513 close, allowing $I_{BB}$ and $Q_{BB}$ to be modulated by an IF carrier frequency around ±524 MHz (+ for the upper band and − for the lower band).

In order to modulate $I_{BB}$ and $Q_{BB}$ for the upper/lower bands, $I_{BB}$ is processed through mixers 502 and 503. IF PLL 506 provides a reference signal to mixer 502 in modulating $I_{BB}$ to $I2_{BB}$. IF PLL 506 also provides the reference signal to mixer 503, but its reference signal is shifted by 90° in phase shifter 507. The resulting quadrature reference signal is mixed with $I_{BB}$ at mixer 503 to produce $IQ_{BB}$. $Q_{BB}$ is processed through mixers 504 and 505. IF PLL 506 provides the same reference signal and quadrature reference signal to mixers 504 and 505, respectively. $Q_{BB}$ is, therefore, modulated with the reference signal to result in $QI_{BB}$ while it is modulated with the quadrature reference signal to result in $Q2_{BB}$. $I2_{BB}$ is combined with $Q2_{BB}$ to generate $I_{IF}$, while $IQ_{BB}$ is combined with $QI_{BB}$ to generate $Q_{IF}$. Again, the selection of whether the signals combine positively or negatively is controlled by the target band of the resulting RF signal.

The selections of whether or not to modulate the baseband signal into the corresponding zero IF signal are determined much like the selections in the receiver path discussed above. When the originating signals are targeted for the upper or lower signal bands, the baseband signals are translated either up (upper band) or down (lower band) to equal the desired zero IF signal frequency, represented by signal band #2—201 (FIG. 2). Otherwise, because the resulting baseband signal targeted for the middle band arrives at the desired signal band #2—201 (FIG. 2) bandwidth, it is passed directly on through to the zero IF signal.

Figure 6:
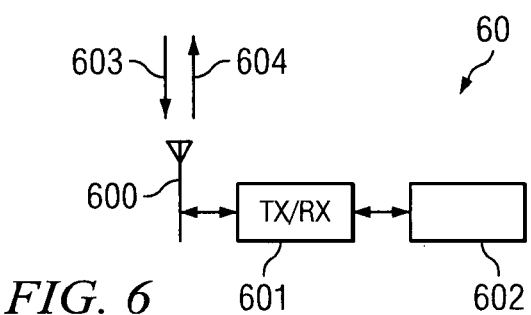
FIG. 6 is a block diagram illustrating a MB-OFDM transceiver configured according to one embodiment of the present invention.

FIG. 6 is a block diagram illustrating MB-OFDM transceiver 601 configured according to one embodiment of the present invention. UWB digital communication system 60 includes interface 602 connected to transceiver 601. The information signals 603 and 604 are transmitted and received through antenna 600. For example, UWB digital communication system 60 may comprise a mobile telecommunication system. A user provides data, which could be audio, video, voice, data, and the like to interface 602. Interface 602 operates using digital information, thus the data provided by the user exists in digital form within interface 602. Transceiver 601 processes the digital data from interface 602 into analog RF data for transmission through antenna 600 as transmitted data 604. The transmission functionality of transceiver 601 operates substantially according to the processes described in transmission path 40 (FIG. 4).

Similarly, broadcast information 603 is received by antenna 600 and processed by transceiver 601 for presentation on interface 602. Transceiver 601 takes the RF broadcast information 603, and converts it to a baseband signal and then into the digital signal that is compatible with interface 602. The receiver functionality of transceiver 601 operates substantially according to the processes described in receiver path 10 (FIG. 1). Thus, transceiver 601 would comprise the various circuit features or features similar to those illustrated and described in FIGS. 1 and 3-5.

It should be noted that although transceiver 601 is described as comprising the similar or same circuit features described in FIGS. 1 and 3-5, transceiver 601 is not limited to only those circuit elements depicted in those FIGURES. The features and functionalities of transceiver 601 may be implemented through various additional and/or alternative circuit elements.

It should further be noted that the specific operable frequencies referred to in the descriptions of FIGS. 1-5 are merely exemplary parameters used for purposes of describing the features and functions of the one embodiment of the present invention. In fact, FIGS. 1-5 have been described in terms of a communication system configured according to the WIMEDIA® standard for UWB communication systems. Additional and/or alternative embodiments of the present invention may be used in conjunction with other types of communication systems, which may, in turn, call for the processing of signal frequencies of a different level or grouping scheme.

Figure 7:
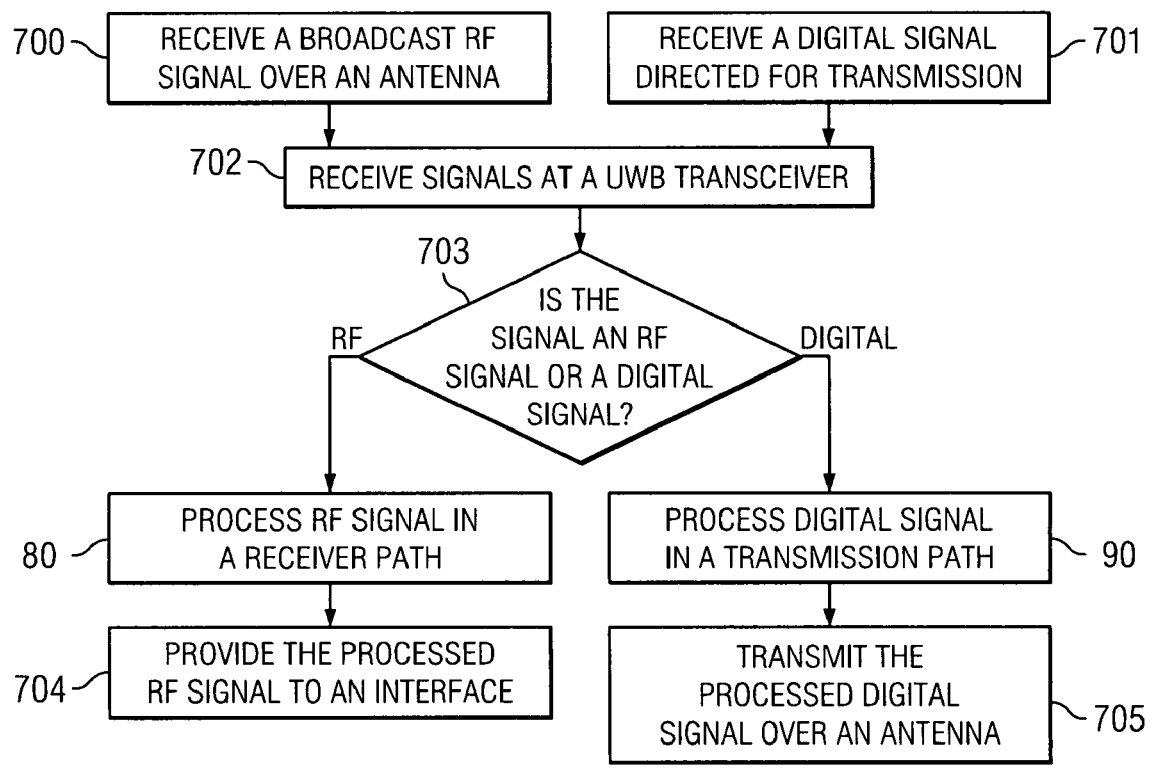
FIG. 7 is a flowchart illustrating example steps executed when operating a UWB transceiver configured according to one embodiment of the present invention.

FIG. 7 is a flowchart illustrating example steps executed when operating a UWB transceiver configured according to one embodiment of the present invention. In step 700, a broadcast RF signal is received over an antenna. On the other end of the system, in step 701, a digital signal directed for transmission. The signals are received at a UWB transceiver in step 702. As any particular signal is received into the transceiver, a determination is made, in step 703, whether the signal is an RF signal (i.e., an in-coming signal), or a digital signal (i.e., an out-going signal). If the signal is an in-coming signal, the RF signal is processed, in receiver process step 80, in a receiver path. The resulting processed RF signal is then provided to an interface in step 704. If the signal is an outgoing signal, the digital signal is processed, in transmission process step 90, in a transmission path. The resulting processed digital signal is then transmitted over an antenna in step 705.

Figure 8:
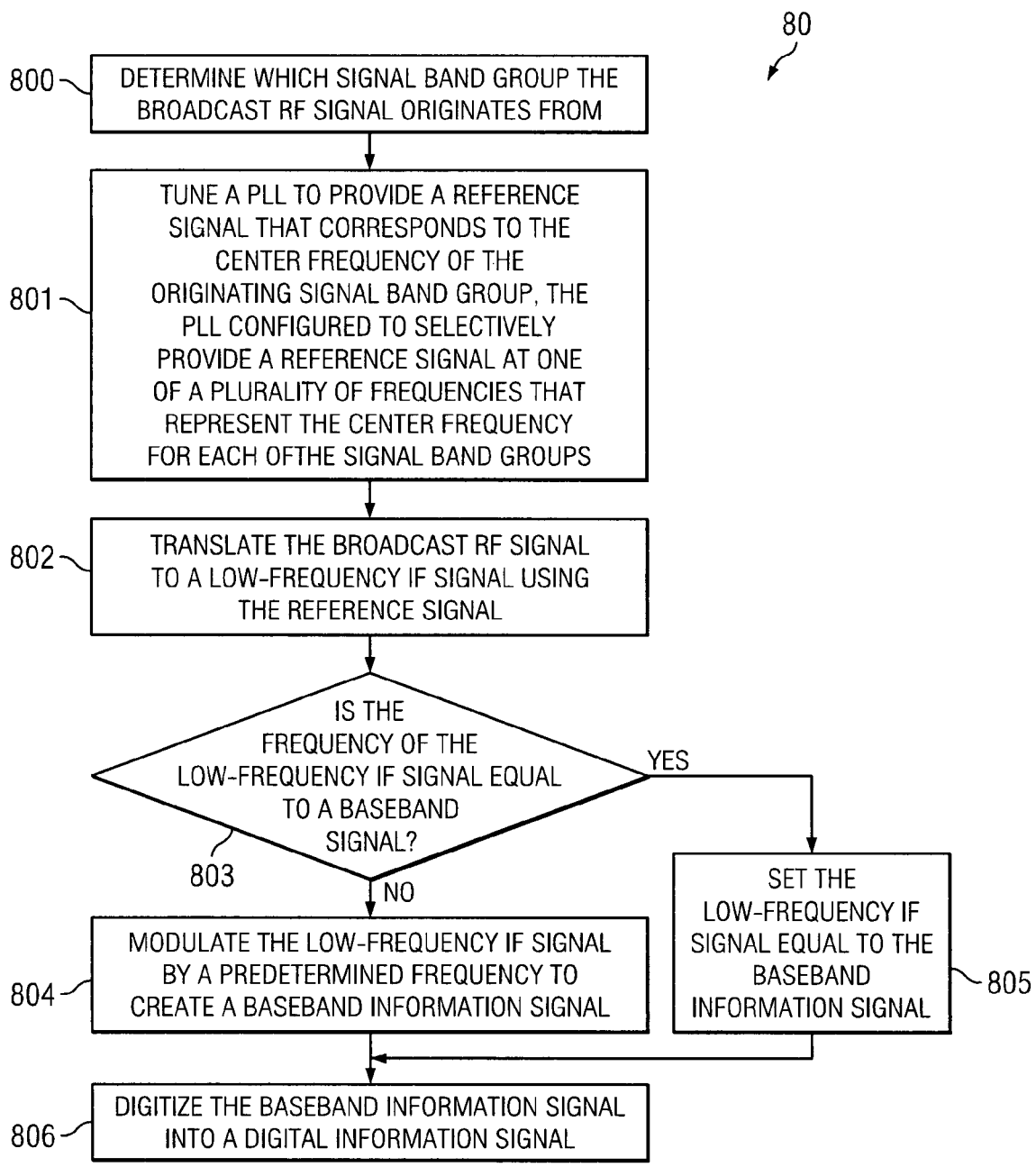
FIG. 8 is a flowchart illustrating example steps executed in the receiver process step illustrated in FIG. 7.

FIG. 8 is a flowchart illustrating example steps executed in receiver process step 80, as illustrated in FIG. 7. In step 800, the signal band group from which the broadcast RF signal originates, is determined. Based on the particular originating signal band group, a PLL is tuned, in step 801, to provide a reference signal that corresponds to the center frequency of the originating signal band group, the PLL configured to selectively provide a reference signal at one of a plurality of frequencies that represent the center frequency for each of the signal band groups. In step 802, the broadcast RF signal is translated to a low-frequency IF signal using the reference signal. A determination is made, in step 803, whether the frequency of the low-frequency IF signal is equal to a baseband signal. If it is not equal to the baseband signal, the low-frequency IF signal is modulated, in step 804, by a predetermined frequency to create a baseband information signal. Otherwise, the low-frequency IF signal is set equal to the baseband information signal in step 805. The resulting baseband information signal is then digitized into a digital information signal, in step 806.

Figure 9:
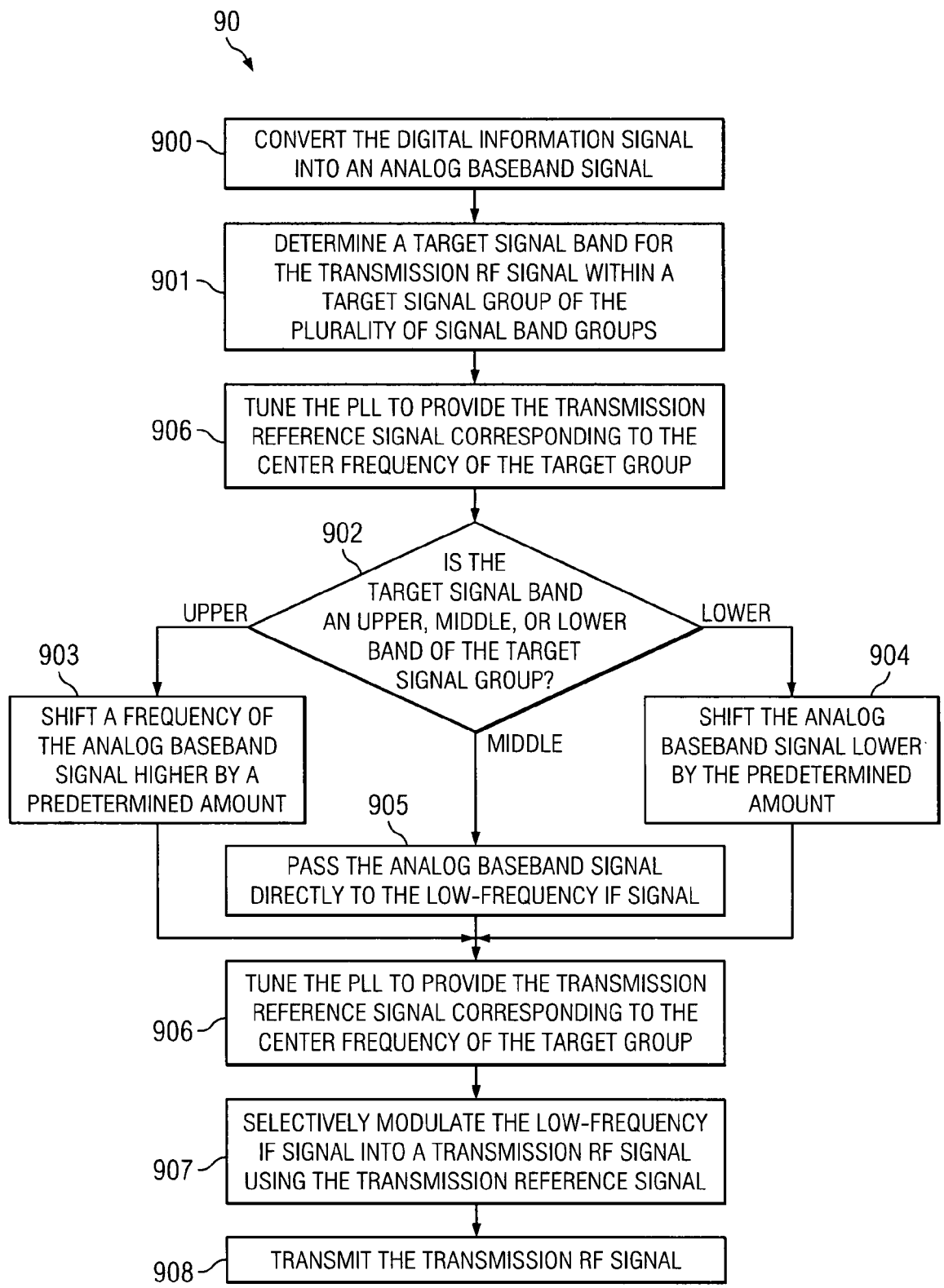
FIG. 9 is a flowchart illustrating example steps executed in the transmission process step illustrated in FIG. 7.

FIG. 9 is a flowchart illustrating example steps executed in transmission process step 90, as illustrated in FIG. 7. In step 900, the digital information signal is converted into an analog baseband signal. The target signal group is then determined from the plurality of signal band groups, in step 901, as well as the target signal band within the target group. The PLL is then tuned, in step 902, to provide the transmission reference signal, wherein the transmission reference signal corresponds to the center frequency of the target signal group. A determination is made, in step 903 whether the target signal band is an upper, middle, or lower band of the target signal group. If the target signal band is the upper band, then the analog baseband signal is shifted higher, in step 904, by a predetermined frequency. If the target signal band is the lower band, then the analog baseband signal is shifted lower, in step 905, by the predetermined amount. If the target signal band is the middle band, then the analog baseband signal is passed directly to the low-frequency IF signal in step 906. The PLL is then tuned again, in step 907, to provide the transmission reference signal, wherein the transmission reference signal corresponds to the center frequency of the target signal group. The low-frequency IF signal is then selectively modulated into a transmission RF signal, in step 908, using the transmission reference signal provided by the PLL. The transmission RF signal is transmitted in step 909.

Although the present invention and its advantages have been described in detail, it should be understood that various changes, substitutions and alterations can be made herein without departing from the spirit and scope of the invention as defined by the appended claims. For example, many of the features and functions discussed above can be implemented in different hardware components or devices. As another example, it will be readily understood by those skilled in the art that, as noted above, the specific operating frequencies may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing one or more information signals comprising:
   receiving a broadcast radio frequency (RF) signal, said broadcast RF signal representing one of said one or more information signals;
   translating said broadcast RF signal to a low-frequency intermediate frequency (IF) signal using a reference signal provided by a phase-locked loop (PLL), said PLL configured to selectively provide said reference signal at one of a plurality of frequencies, wherein each said plurality of frequencies represent a center frequency for a plurality of signal band groups;

selectively modulating said low-frequency IF signal into a baseband information signal, wherein said selectively modulating said low-frequency IF signal comprises selecting one of modulating said low-frequency IF signal and not modulating said low-frequency IF signal;

digitizing said baseband information signal into a digital information signal;

designating another digital information signal for transmission;

converting said another digital information signal into an analog baseband signal;

selectively converting said analog baseband signal into another low-frequency IF signal, wherein said selectively converting said analog baseband signal comprises selecting one of converting said analog baseband signal and not converting said analog baseband signal;

selectively modulating said another low-frequency IF signal into a transmission RF signal using a transmission reference signal provided by said PLL; and transmitting said transmission RF signal.

2. The method of claim 1 further comprising:
determining one of said plurality of signal band groups from which said broadcast RF signal originates; and
tuning said PLL to provide said reference signal, wherein said reference signal corresponds to said center frequency of said determined one of said plurality of signal band groups.

3. The method of claim 1 wherein said selectively modulating said low-frequency IF signal comprises one of:
said modulating by a predetermined frequency when a frequency of said low-frequency IF signal is unequal to a baseband frequency; and
said not modulating when said frequency of said low-frequency IF signal is equal to said baseband frequency.

4. The method of claim 1 wherein said selectively converting said analog baseband comprises:
determining for said transmission RF signal a target signal band within a target group of said plurality of signal band groups;
responsive to said determining, selecting one of:
said converting said analog baseband by shifting a frequency of said analog baseband signal higher or lower by a predetermined amount when said target signal band is within an upper band or a lower band, respectively, of said target group; and
said not converting said analog baseband by passing said analog baseband signal directly to said another low-frequency IF signal when said target signal band is within a middle band of said target group.

5. The method of claim 1 wherein said selectively modulating said another low-frequency IF signal comprises:
determining a target group of said plurality of signal band groups for which said transmission RF signal is intended; and
tuning said PLL to provide said transmission reference signal, wherein said transmission reference signal corresponds to said center frequency of said determined target group.

6. The method of claim 1 further comprising:
receiving said low-frequency IF signal as a pair of quadrature signals responsive to said translating said broadcast RF signal, wherein said baseband information signal remains in said pair of quadrature signals; and
receiving said another digital information signal as said pair of quadrature signals, wherein said another low-frequency IF signal remains in said pair of quadrature signals, and wherein said pair of quadrature signals of said low-frequency IF signal are re-combined in said transmission RF signal.

7. The method of claim 6 further comprising:
providing said broadcast RF signal and said reference signal to a first mixer during said translating said broadcast RF signal, wherein output of said first mixer comprises an information (I) signal of said pair of quadrature signals; and
providing said broadcast RF signal and a quadrature reference signal to a second mixer, wherein said quadrature reference signal results from shifting a phase of said reference signal by 90°, and wherein output of said second mixer comprises a quadrature (Q) signal of said pair of quadrature signals.

8. The method of claim 7 further comprising:
providing said transmission reference signal and an I signal of said pair of quadrature signals representing said another low-frequency IF signal to a third mixer during said selectively modulating said another low-frequency IF signal, wherein output of said third mixer comprises said transmission RF signal; and
providing a quadrature transmission reference signal and a Q signal of said pair of quadrature signals representing said another low-frequency IF signal to a fourth mixer during said selectively modulating said another low-frequency IF signal, wherein said quadrature transmission reference signal results from shifting said phase of said transmission reference signal by 90°, and wherein output of said fourth mixer comprises said transmission RF signal.

9. The method of claim 1 wherein said broadcast RF signal is received and said transmission RF signal is transmitted using multi-band orthogonal frequency division multiplexing (MB-OFDM).

10. The method of claim 1 wherein said plurality of signal band groups is organized according Ecma-368 standard.

11. An ultra wideband (UWB) communication component comprising:
a digital-to-analog converter (DAC) operable to convert input digital data into a baseband analog signal;
a selective intermediate frequency (IF) component configured to selectively generate a low-frequency IF signal from said baseband analog signal, said selection based on a target signal band in a target one of a plurality of signal band groups, wherein said selective IF component comprises:
a first path providing an unprocessed link between said baseband analog signal and output of said low-frequency IF signal, wherein a frequency of said output low-frequency IF signal equals a baseband frequency of said baseband analog signal;
a second path for translating said baseband analog signal into said low-frequency IF signal; and
one or more frequency-controlled switches, operable, based on said target signal band, to select one of said first path and said second path;
a phase-locked loop (PLL) adapted to selectively produce a reference signal at one of a plurality of center frequencies associated with said plurality of signal band groups; and a radio frequency (RF) modulator configured to use said reference signal to modulate said low-frequency IF signal into a RF transmission signal of said target signal band.

12. The UWB communication component of claim 11 further comprising:
a low pass filter configured to filter out unwanted signals above a cutoff frequency.

13. The UWB communication component of claim 12 wherein said cutoff frequency is about 792 MHz.

14. The UWB communication component of claim 11 further comprising:
a power amplifier connected to said RF modulator for amplifying a power value of said RF transmission signal prior to transmission.

15. The UWB communication component of claim 11 further comprising:
a 90° phase shifter connected to said PLL; and
a quadrature RF modulator for converting a quadrature component of said low-frequency IF signal into said RF transmission signal, wherein said quadrature RF modulator uses said reference signal after processing through said 90° phase shifter.

16. The UWB communication component of claim 11 further comprising;
a quadrature phase shifter within said second path; and
a quadrature mixer operable to generate a quadrature component of said baseband analog signal using an IF reference signal.

17. The UWB communication component of claim 16 wherein said baseband analog signal comprises:
a baseband quadrature component; and
a baseband information component.

18. The UWB communication component of claim 11 further comprising:
a receiver path, said receiver path comprising:
a mixer configured to use a receiver reference signal from said PLL to translate a received RF data signal into another low-frequency IF signal;
a selective IF receiver component configured to selectively generate another baseband analog signal, said selection based on an originating signal band in one of said plurality of signal band groups; and
an analog-to-digital converter (ADC) operable to convert said another baseband analog signal into a digital information signal.

19. The UWB communication component of claim 18 further comprising:
a low noise amplifier (LNA) connected at an input to said receiver path, said LNA operable to condition said received RF data signal.

20. The UWB communication component of claim 18 further comprising:
a low pass filter configured to filter out unwanted signals above a cutoff frequency.

21. The UWB communication component of claim 20 wherein said cutoff frequency is about 792 MHz.

22. The UWB communication component of claim 18 further comprising:
a 90° delay circuit connected to said PLL; and
a quadrature mixer for creating a quadrature component of said another low-frequency IF signal from said received RF signal, wherein said quadrature mixer uses said reference signal after processing through said 90° delay circuit.

23. The UWB communication component of claim 18 wherein said selective IF receiver component comprises:
a first receiver path providing an unprocessed link between said another low-frequency IF signal and output of said another baseband analog signal, wherein a frequency of said output of said another baseband analog signal equals another frequency of said another low-frequency IF signal;
a second receiver path for translating said another low-frequency IF signal into said another baseband analog signal; and
one or more frequency-responsive switches, operable, based on said originating signal band, to select one of said first receiver path and said second receiver path.

24. The UWB communication component of claim 23 further comprising;
a quadrature phase translator within said second receiver path; and
a quadrature receiver mixer operable to generate a quadrature component of said another low-frequency IF signal using an IF receiver reference signal.

25. The UWB communication component of claim 23 wherein said low-frequency
IF signal comprises:
an IF quadrature component; and
an IF information component.

26. The UWB communication component of claim 11 wherein said UWB communication component uses multi-band orthogonal frequency division multiplexing (MB-OFDM).

27. A method for processing ultra wideband (UWB) information signals, said method comprising:
receiving an RF information signal having a frequency within one of a plurality of signal band groups;
responsive to said frequency, selecting a reference signal from a plurality of frequencies, each said plurality of frequencies representing a center frequency for said plurality of signal band groups;
mixing said RF information signal into a zero IF signal using said selected reference signal;
selectively converting said zero IF signal into a baseband signal, wherein said selectively converting comprises:
outputting said zero IF signal as said baseband signal responsive to said frequency being within a middle band of said one of said plurality of signal band groups;
translating said zero IF signal higher by a predetermined amount responsive to said frequency being within an upper band; and
translating said zero IF signal lower by said predetermined amount responsive to said frequency being within a lower band; and
digitizing said baseband signal into a digital information signal.

28. The method of claim 27 further comprising:
conditioning said RF information signal using a low noise amplifier (LNA) prior to said mixing; and
filtering unwanted signals above a cutoff frequency.

29. The method of claim 28 wherein said cutoff frequency is about 792 MHz.

30. The method of claim 27 wherein each of said zero IF signal, said baseband signal, and said digital information signal have an information component and a quadrature component.

31. The method of claim 27 further comprising:
converting an outbound digital information signal to an outbound analog baseband signal, said outbound digital information signal intended for a target signal band group;
selectively translating said outbound baseband signal into an outbound zero IF signal;
selecting an outbound reference signal from said plurality of frequencies, wherein said outbound reference signal corresponds to said target signal band group; and
modulating said outbound zero IF with said outbound reference signal to create an outbound RF signal within said target signal band group.

32. The method of claim 31 further comprising:
filtering unwanted signals from said outbound zero IF signal over a cutoff frequency; and
amplifying said outbound RF signal before transmission.

33. The method of claim 31 wherein said selectively translating comprises:
outputting said outbound baseband signal as said outbound zero IF signal responsive to a target signal band being within a middle band of said target signal band group;
translating said outbound baseband signal higher by a predetermined amount responsive to said target signal band being within an upper band of said target signal band group; and
translating said outbound baseband signal lower by said predetermined amount responsive to said target signal band being within a lower band.

34. The method of claim 31 wherein each of said outbound zero IF signal, said outbound baseband signal, and said outbound digital information signal have an information component and a quadrature component.

35. The method of claim 31 wherein said RF information signal is received and said outbound RF signal is transmitted using multi-band orthogonal frequency division multiplexing (MB-OFDM).

36. An ultra wideband (UWB) transceiver comprising:
a receiver path; and
a transmitter path, said transmitter path comprising:
    a digital-to-analog converter (DAC) operable to convert input digital data into a baseband analog signal;
    a selective intermediate frequency (IF) component configured to selectively generate a low-frequency IF signal from said baseband analog signal, said selection based on a target signal band in a target one of a plurality of signal band groups, wherein said selective IF component comprises:
    a first path providing an unprocessed link between said baseband analog signal and output of said low-frequency IF signal, wherein a frequency of said output low-frequency IF signal equals a baseband frequency of said baseband analog signal;
    a second path for translating said baseband analog signal into said low-frequency IF signal; and
    one or more frequency-controlled switches, operable, based on said target signal band, to select one of said first path and said second path;
a phase-locked loop (PLL) adapted to selectively produce a reference signal at one of a plurality of center frequencies associated with said plurality of signal band groups; and
a radio frequency (RF) modulator configured to use said reference signal to modulate said low-frequency IF signal into a RF transmission signal of said target signal band;
said receiver path comprising:
    a mixer configured to use a receiver reference signal from said PLL to translate a received RF data signal into another low-frequency IF signal;
    a selective IF receiver component configured to selectively generate another baseband analog signal, said selection based on an originating signal band in one of said plurality of signal band groups; and
    an analog-to-digital converter (ADC) operable to convert said another baseband analog signal into a digital information signal.

37. The UWB transceiver of claim 36 further comprising:
a low pass filter configured to filter out unwanted signals above a cutoff frequency; and
a power amplifier connected to said RF modulator for amplifying a power value of said RF transmission signal prior to transmission.

38. The UWB transceiver of claim 37 wherein said cutoff frequency is about 792 MHz.

39. The UWB transceiver of claim 36 further comprising:
a 90° phase shifter connected to said PLL; and
a quadrature RF modulator for converting a quadrature component of said low-frequency IF signal into said RF transmission signal, wherein said quadrature RF modulator uses said reference signal after processing through said 90° phase shifter.

40. The UWB transceiver of claim 36 further comprising;
a quadrature phase shifter within said transmitter path; and
a quadrature mixer operable to generate a quadrature component of said baseband analog signal using an IF reference signal.

41. The UWB transceiver of claim 36 further comprising:
a low noise amplifier (LNA) connected at an input to said receiver path, said LNA operable to condition said received RF data signal; and
a low pass filter configured to filter out unwanted signals above a cutoff frequency.

42. The UWB transceiver of claim 41 wherein said cutoff frequency is about 792 MHz.

43. The UWB transceiver of claim 36 further comprising:
a 90° delay circuit connected to said PLL; and
a quadrature mixer for creating a quadrature component of said another low-frequency IF signal from said received RF data signal, wherein said quadrature mixer uses said reference signal after processing through said 90° delay circuit.

44. The UWB transceiver of claim 36 wherein said selective IF receiver component comprises:
a first receiver path providing an unprocessed link between said another low-frequency IF signal and output of said another baseband analog signal, wherein a frequency of said output of said another baseband analog signal equals another frequency of said another low-frequency IF signal;
a second receiver path for translating said another low-frequency IF signal into said another baseband analog signal; and
one or more frequency-responsive switches, operable, based on said originating signal band, to select one of said first receiver path and said second receiver path.

45. The UWB transceiver of claim 36 further comprising;
a quadrature phase translator within said receiver path; and
a quadrature receiver mixer operable to generate a quadrature component of said another low-frequency IF signal using an IF receiver reference signal.

46. The UWB transceiver of claim 36 wherein said input digital data, said baseband analog signal, said low-frequency IF signal, said another low-frequency IF signal, said another baseband analog signal, and said digital information signal comprise:
a quadrature component; and
an information component.

47. The UWB transceiver of claim 36, wherein said UWB transceiver comprises a multi-band orthogonal frequency division multiplex (MB-OFDM) UWB transceiver.

* * * * *

UNITED STATES PATENT AND TRADEMARK OFFICE
CERTIFICATE OF CORRECTION

| | | |
|---|---|---|
| PATENT NO. | : 8,005,435 B2 | Page 1 of 1 |
| APPLICATION NO. | : 11/799065 | |
| DATED | : August 23, 2011 | |
| INVENTOR(S) | : Jon | |

It is certified that error appears in the above-identified patent and that said Letters Patent is hereby corrected as shown below:

In Col. 15, line 21, claim 33, delete "IE" and insert --IF--.

Signed and Sealed this
Eighth Day of November, 2011

David J. Kappos
*Director of the United States Patent and Trademark Office*